(12) United States Patent
Holstein et al.

(10) Patent No.: US 9,003,052 B2
(45) Date of Patent: Apr. 7, 2015

(54) SYSTEM AND METHOD FOR AIR-TO-GROUND DATA STREAMING

(75) Inventors: Stephen C. Holstein, Seattle, WA (US); Tri M. Phan, Renton, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 13/544,961

(22) Filed: Jul. 9, 2012

(65) Prior Publication Data

US 2014/0013002 A1 Jan. 9, 2014

(51) Int. Cl.
*G06F 15/16* (2006.01)
*H04B 7/185* (2006.01)
*H04W 84/06* (2009.01)

(52) U.S. Cl.
CPC ............ *H04B 7/18504* (2013.01); *H04W 84/06* (2013.01)

(58) Field of Classification Search
CPC ....................................................... H01Q 1/246
USPC .......................................................... 709/231
See application file for complete search history.

(56) References Cited

U.S. PATENT DOCUMENTS

| 8,135,500 B1* | 3/2012 | Robinson ........................... 701/3 |
| 2003/0065428 A1* | 4/2003 | Mendelson et al. .............. 701/9 |
| 2008/0102812 A1* | 5/2008 | Chari et al. .................... 455/424 |
| 2009/0037034 A1* | 2/2009 | Mattingly et al. ................. 701/3 |

OTHER PUBLICATIONS

Patent Cooperation Treaty, International Search Report and Written Opinion for PCT/US2013/048072 dated May 20, 2014.
The International Bureau of WIPO, International Preliminary Report on Patentability issued in PCT/US2013/048072, dated Jan. 22, 2015.

\* cited by examiner

*Primary Examiner* — Wing F Chan
*Assistant Examiner* — Andrew Woo
(74) *Attorney, Agent, or Firm* — Parsons Behle & Latimer

(57) ABSTRACT

A method for air-to-ground data streaming includes receiving data, by a processor aboard an aircraft, from an LRU aboard the aircraft, encoding the data according to a data map received from a ground station, and transmitting the encoded data in real time to the ground station via a transmission link selected by a dynamic link manager, configured to identify and select a most efficient data path.

22 Claims, 5 Drawing Sheets

SYSTEM AND METHOD FOR AIR-TO-GROUND DATA STREAMING

BACKGROUND

1. Field of the Invention

The present invention relates generally to transmission of data from operating aircraft to receivers on the ground. More particularly, the present invention relates to a system and method for streaming avionics data that conserves bandwidth while providing desired data.

2. Related Art

Flight data recorders (FDRs) record information to help determine the nature and causes of accidents. However, in certain situations it may be difficult to find and recover a FDR. This and other aspects of aviation incidents have led to a number of recommendations related to remote monitoring of aircraft. These recommendations include more accurate airplane location tracking to simplify recovery of flight data recorders, and also called for aircraft to have the ability to stream black box data over the air. The ability of ground observers to evaluate avionics data while a plane is in flight could help to resolve emergency situations in the future.

While it is desirable to stream avionics data from aircraft during flight, one challenge in doing so is the bandwidth for such transmissions. Transmitting all flight data continuously requires significant bandwidth and imposes significant costs. For example, such flight data can include static reports about the operation of specific aircraft systems. These reports can include relatively large amounts of data, and use significant bandwidth. The present application seeks to address one or more of the above issues.

SUMMARY

It has been recognized that it would be advantageous to develop an avionics streaming system that can continuously transmit avionics, positional and other data from aircraft during flight.

It has also been recognized that it would be advantageous to have an avionics streaming system that allows remote monitoring of an aircraft and allows feedback from ground personnel to flight crews.

It has also been recognized that it would be advantageous to have a system that provides a copy of flight data on the ground, in case aircraft flight data recorders cannot be recovered.

It has also been recognized that it would be advantageous to have an avionics streaming system that uses a small bandwidth for transmitting relevant data.

In accordance with one embodiment thereof, the present invention provides a data streaming system including an onboard processor, a ground station, and a dynamic link manager. The onboard processor is disposed aboard an aircraft, and is configured to receive and store a data map, and to receive and encode data from an onboard LRU per the data map, and to transmit the encoded data via a transmission link. The ground station has a processor configured to communicate the data map to the onboard processor via the transmission link, and to receive and decode the encoded data from the onboard processor per the data map. The dynamic link manager is configured to identify and select at least one data path for the transmission link between the onboard processor and the ground station, and to transmit data from the onboard processor to the ground processor via the selected data path. In accordance with another aspect thereof, the invention provides an aircraft including an onboard processor, and a dynamic link manager. The onboard processor is configured to receive and store a data map transmitted from a ground station, and to receive and encode data from an onboard LRU per the data map, and to transmit the encoded data via a transmission link to a processor of the ground station. The dynamic link manager is configured to identify and select at least one data path for the transmission link between the onboard processor and the ground station, and to transmit data from the onboard processor to the ground processor via the selected data path.

In accordance with yet another aspect thereof, the invention provides a method for air-to-ground data streaming. The method includes receiving data, by a processor aboard an aircraft, from an LRU aboard the aircraft, encoding the data according to a data map received from a ground station, and transmitting the encoded data in real time to the ground station via a transmission link selected by a dynamic link manager, configured to identify and select a most efficient data path.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
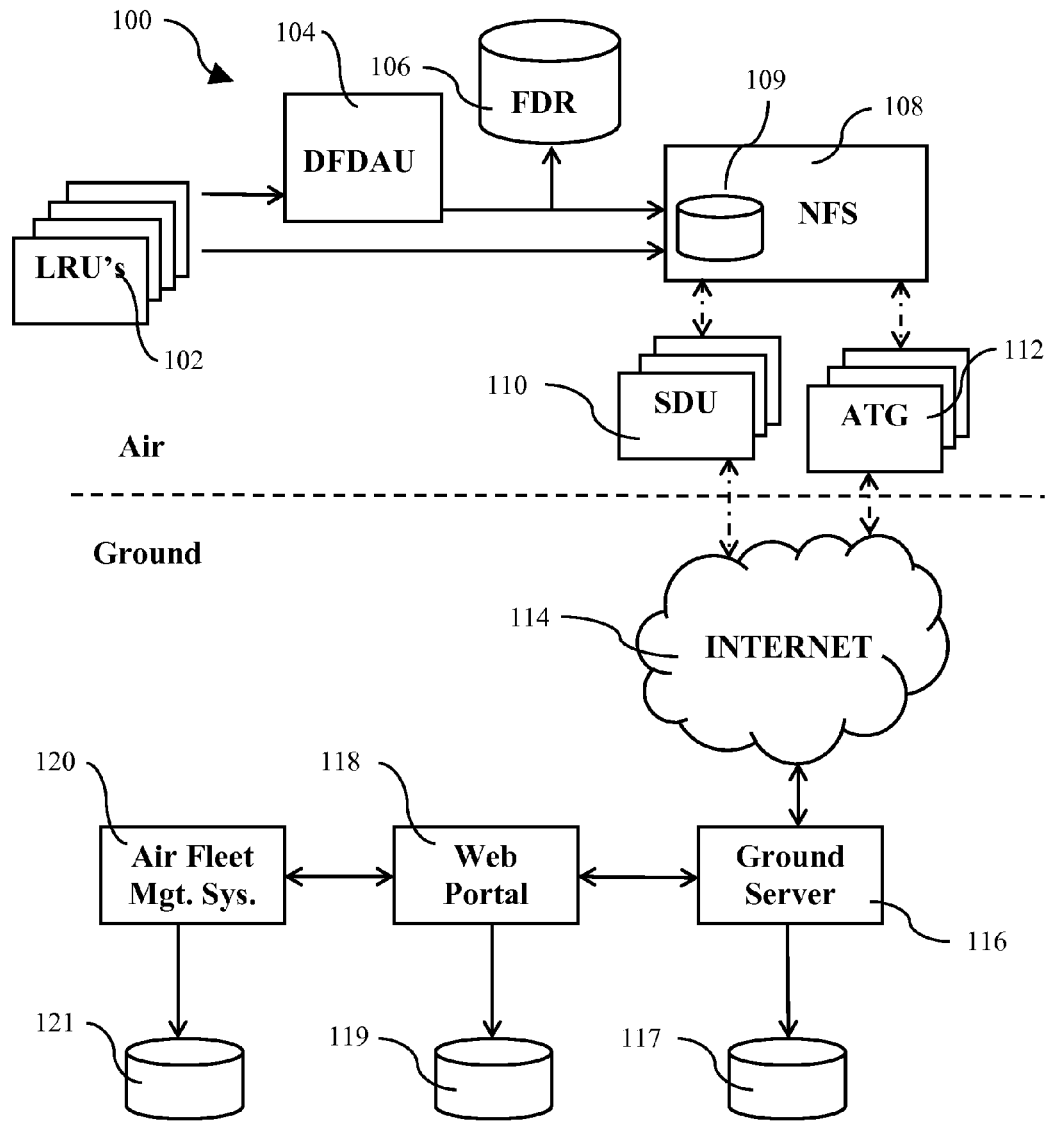
FIG. 1 is a structural diagram of an embodiment of an air-to-ground avionics streaming system in accordance with the present disclosure.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, the terms "streaming," "avionics streaming" and "data streaming" and related terms have reference to the transfer of any type of data via any wireless transmission means. This term is intended to be broader in scope than the term "telemetry," which is often used to refer to the transmission of data that represents a measure of something. The data that is streamed in the present disclosure encompasses more than just measurements.

Proposed avionics streaming solutions present several challenges. For example, some proposed solutions have focused on creating and transmitting static reports of avionics data. Unfortunately, the computational overhead associated with each report, as well as the retransmission of content, requires significant bandwidth, which presents a high cost. Additionally, if all flight data is continuously transmitted, the data interchanged with the aircraft can be highly redundant (because the same measurement is often reported by multiple sources) and repetitive (every measurement is transmitted, even if it is the same value as the last). While these characteristics help ensure desired functioning and monitoring of an aircraft, they present significant data transmission costs.

Advantageously, a system and method for air-to-ground streaming of avionics data has been developed that significantly reduces bandwidth while still allowing real-time monitoring of aircraft location, operation, etc., and also allows ground-based recording of flight data. Two observations contribute to this development. The first observation is that a ground observer really only needs to know the current state of an aircraft relevant to their particular role. As interest grows, an ever increasing set of ground observer roles has emerged, requiring both common and unique information. Advantageously, the system and method disclosed herein combines ground observer requests to determine the minimal set of data necessary to transmit. A ground station can then extract the data and create a customized report based upon the particular ground observer's needs. In this way, the aircraft need only send the data once, and the same data can serve multiple ground observers.

The second observation is that, since avionics data tends to be highly repetitive, compression algorithms are likely to perform well. By understanding avionics protocols, the data stream format can be optimized for compression, dramatically reducing the bandwidth. The system and method disclosed herein focuses on concentrating and optimizing the transmission of data, passing the duty of report generation to ground resources. This optimization of bandwidth is believed to make air-to-ground streaming cost-effective.

Shown in FIG. 1 is a structural diagram of an embodiment of an air-to-ground avionics streaming system 100 in accordance with the present disclosure. Commercial aircraft include a number of Line Replaceable Units 102 (LRU's), which are modular components that implement avionics functionality. LRU's 102 that are widely used include flight management computers, engine maintenance units, etc. Many of the LRU's 102 are coupled to a Digital Flight Data Acquisition Unit 104 (DFDAU), which provides a connectivity hub that collects many LRU 102 inputs (e.g. type 717 avionics data) and passes them on. Other LRU data, such as type 429 data, can be passed directly from the LRU's to an onboard processor, as discussed below.

From the DFDAU 104, avionics data takes two paths. First, during operation of the aircraft, avionics data is automatically and continuously transmitted to the Flight Data Recorder 106 (FDR), which can be a Digital Flight Data Recorder (DFDR). As is well known, an FDR 106, sometimes also called a "Black Box," is a physical recorder device that is installed in an aircraft and records avionics data, cockpit voices, etc. in a manner that is well known. FDR's enable later retrieval of the flight data for analysis and investigation in case of a flight incident, etc. The data that is recorded by the FDR 106 can include parameters that are dictated or suggested by a regulatory agency, such as the U.S. Federal Aviation Administration (FAA), though the aircraft can be (and frequently is) configured to produce and record additional parameters as well.

The avionics data from the DFDAU 104 is also transmitted to a Network File System 108 (NFS), which is an onboard processor that controls the air-to-ground streaming system 100. Other LRU avionics data that does not pass through the DFDAU is also passed to the NFS. The NFS 108 is an LRU, and can be viewed as a primary Onboard Network System (ONS). The NFS 108 performs several functions. The NFS 108 can include a data recording device 109 (e.g. a solid state disk (SSD)), and can be programmed to operate as a Quick Access Recorder (QAR). Those of skill in the art will be aware that QAR devices can be separate LRU devices, or they can be implemented in software, as in the present example. With these features, the NFS 108 receives and records all of the avionics data that is produced by the aircraft, including all of the data recorded by the FDR 106, plus any additional data that the aircraft is configured to produce. This additional data storage can be used in various ways, as discussed below.

Figure 2:
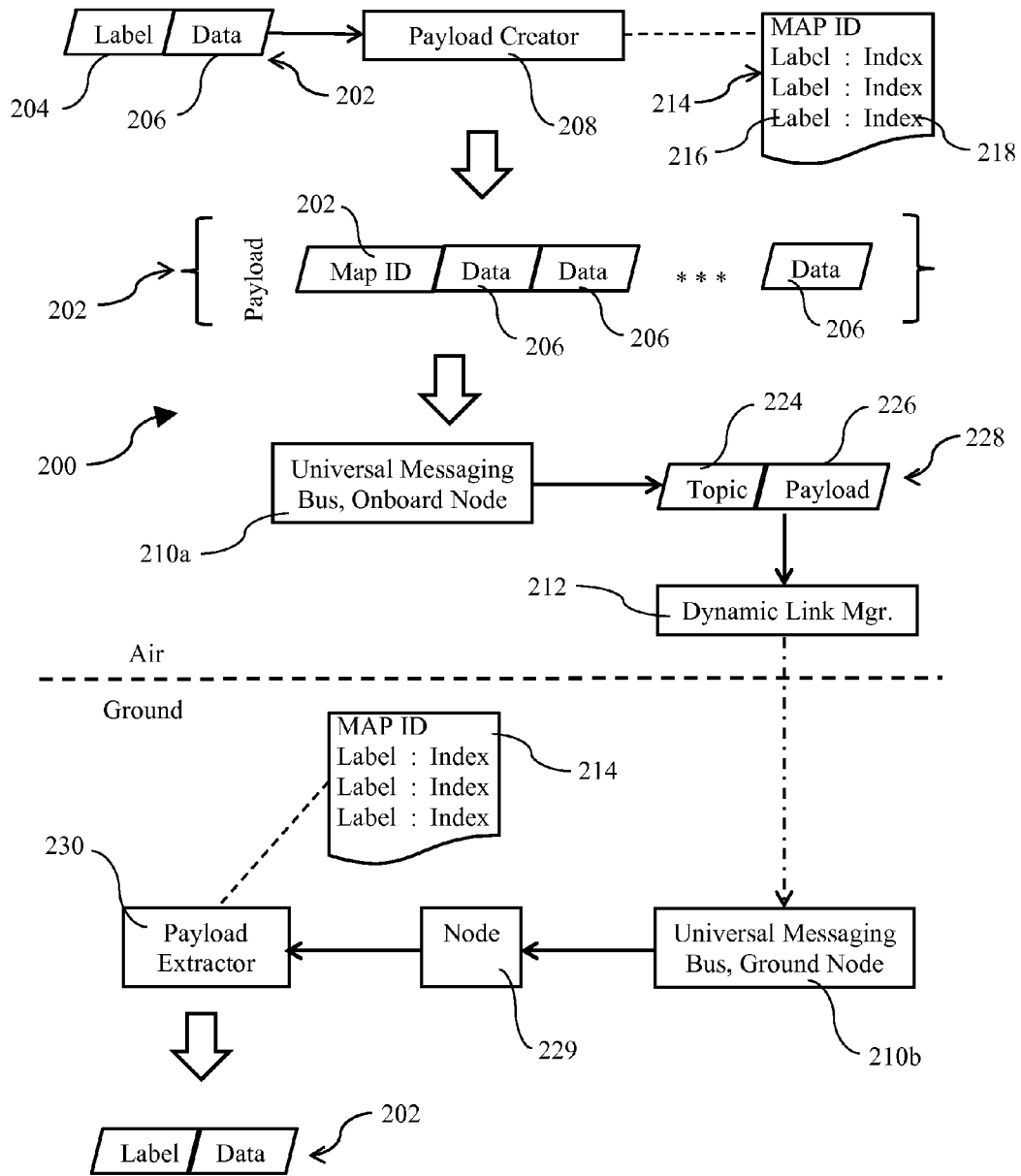
FIG. 2 is a functional diagram of an embodiment of a method for air-to-ground avionics streaming using the system shown in FIG. 1.

A functional or process diagram of the air-to-ground avionics streaming method using the system shown in FIG. 1 is provided in FIG. 2. Each item 202 of avionics data that is routed to the NFS 108 includes a label 204 and a data string 206. The label 204 identifies the source of the data (e.g. the identity of the LRU 102 from which the data comes) and the data string 206 provides the relevant information. For example, the LRU for a particular data item 202 may be an altimeter, and the data would represent the altitude reading of that altimeter. In such a situation the raw data packet 202 could include a label 204 that is a number which identifies the altimeter, and the data string 206 could be a number representing the altitude reading. The data string 206 could also include a time stamp (not shown) of a certain discrete number of bits, that represents the time of the data reading.

Viewing FIG. 2, the NFS (108 in FIG. 1) generally includes a payload creator 208, a universal messaging bus, generally 210, and a dynamic link management unit 212. The payload creator 208 comprises software instructions for modifying the raw data packets 202 according to a data map 214. The map 214 is a set of instructions that indicate which raw data packets 202 are to be selected for transmission, and how they are to be encoded or compressed. The map 214 includes a series of labels 216 and an index 218 associated with each label. These labels 216 correspond to the labels 204 of the specific data packets 202 that are to be transmitted. The programming of the payload creator 208 causes the NFS (108 in FIG. 1) to select specific data packets 202 that are identified by the map 214, and disregard the rest.

By selecting specific data packets 202 to transmit, rather than transmitting all avionics data, the payload creator 208 performs a filtering function, which reduces the total data volume to transmit. For example, a digital flight data recorder may be configured to record ninety-one (91) separate pieces of avionics data. The NFS (108 in FIG. 1) can receive this set of data along with additional pieces of data that are above and beyond the data set recorded by the FDR. However, this volume of data is generally only needed for the analysis of unusual flight events. While it is relatively straightforward and inexpensive for the flight data recorder (106 in FIG. 1) and NFS data storage device (109 in FIG. 1) to continuously record this entire volume of data, it is relatively expensive to continuously transmit this entire volume of data during routine flights. For routine situations, the map 214 can identify a subset of this data representing specific items of information that are desired, such as location (e.g. latitude, longitude and altitude) and flight control inputs (e.g. position of flight deck controls for control yoke, elevator and rudder), and disregard the remaining data, at least with respect to transmission. Other data subsets can be selected for routine operation, as discussed below.

The programming of the payload creator 208 also causes the NFS (108 in FIG. 1) to take each data packet 202 that is to be transmitted and remove its label 204. This step also greatly reduces the data volume. At this point, the payload creator 208 concatenates each of the raw data strings 206, without their labels, in a specific order (according to the map 214) and appends them with a map ID 220, to form a single data payload 222. The map ID 220 indicates the particular data map 214 that was used in the creation of the payload 222, and is used as a key to decode the data, as discussed below. This function of the payload creator 208 places the data in a desirable form for later compression.

The payload 222 is then provided to the universal messaging bus 210, which is another software module that performs compression, routing and security functions on the payload. The universal messaging bus 210 includes two portions, an onboard node 210 that is aboard the aircraft, and a corresponding ground node 210b. These two universal messaging bus nodes are designed to send and receive the streaming transmissions.

The universal messaging bus onboard node 210a can be configured to compress the payload 222. The payload 222 can be compressed through any of a variety of compression algorithms to produce a compressed payload 226. As is well known, data compression involves encoding information using fewer bits than the original representation. Bits can be reduced without losing any data by identifying and eliminating statistical redundancy. Data compression software that can be used in this sort of system is widely available. For example, one commercially available data compression software package is Deflate®, which is a lossless data compression algorithm that uses a combination of the LZ77 algorithm and Huffman coding. Other compression algorithms and compression software products can also be used.

The universal messaging bus onboard node 210a also produces a topic 224 and appends the topic to the compressed payload 226, producing the final data unit 228 that is to be transmitted. The topic 224 does not identify the destination of the final data unit 228, but simply identifies the payload on the bus 210. Once the data has been transmitted to the ground-based communications system (e.g. Internet 114 in FIG. 1), any recipient who subscribes to the topic 224 can obtain the data. Such recipients (e.g. authorized users) will presumably have the data map 214 in order to decode the final data unit 228, working backward from the final data unit 228 to the payload 222, to the individual raw data packets 202, as described above.

The universal messaging bus 210, or any other portion of the NFS (108 in FIG. 1), also handles computational tasks associated with data security. It will be apparent that avionics data that is transmitted wirelessly is subject to possible interception or other security issues. Accordingly, the NFS 108 can be programmed to use data security technology for authentication and encryption of the final data units 228 in connection with their transmission. There are a variety of known data security protocols that can be used for this, such as TLS (transport layer security), SSL (secure sockets layer), etc. These encryption technologies are well known and involve the production of symmetric keys for encryption and decryption of data for transmission, and the use of digital signatures for authentication of a data connection. Other data encryption and security systems can also be used, and those of skill in the art will be able to provide software for applying data encryption to the final data units 228.

Referring back to FIG. 2, once the final data unit 228 is completed and encrypted, it is ready for transmission. Transmission of the final data unit is handled by the dynamic link manager 212, which can be a portion of the NFS (108 in FIG. 1), and is programmed to find and select an efficient route(s) for transmission of the final data unit 228 to the universal messaging bus ground node 210b. Advantageously, the dynamic link manager 212 is configured to transmit the data to one or more selected ground nodes, rather than broadly transmitting to all. This feature allows a reduction in the transmission power needed, and therefore reduces costs. Transmission of the final data unit 228 can be by any suitable method, such as satellite, ground-based connectivity and air-to-ground RF (radio frequency) transmission. Different transmission methods can be used at different times, depending on available bandwidth, cost, signal strength, and other factors. Moreover, multiple transmission methods can be used simultaneously, if desired. For example, transoceanic flights are likely to be out of range of ground-based cellular transmission systems, and air-to-ground radio may not have adequate signal strength or quality in such a situation. Consequently, satellite transmission may be the best choice during a transoceanic flight, despite its relatively higher cost. However, during a transcontinental flight over populated areas, transmission to ground-based cell towers may be suitable.

The dynamic link manager 212 is configured to substantially continuously scan, seek and evaluate available transmission links in view of known costs in order to find an efficient communication link, switching between different links as needed during flight. The dynamic link manager 212 maintains the available communication channels and determines the best route or routes upon which to forward the message toward subscribers via the available messaging bus node. Intermediate messaging bus nodes (229 in FIG. 2) similarly manage their communication channels to deliver the message to the subscriber. Referring back to FIG. 1, the NFS 108 (via its dynamic link manager, 212 in FIG. 2) can transmit data via a satellite data unit 110 (SDU—i.e. a communications satellite) and/or air-to-ground connection 112 (ATG—i.e. ground-based cellular communications system, etc.) so that the final data units 228 are connected into a publicly accessible global communications network, such as the Internet 114. As suggested by FIG. 1, there can be many different satellite 110 connection alternatives, and many different air-to-ground 112 connection alternatives, and these can be used simultaneously, sequentially, or in any other manner. Data can also be streamed using a terminal wireless LAN unit (TWLU), such as when and aircraft is on the ground at an air terminal.

As shown in FIG. 1, the streamed data messages are delivered to a ground server 116, called a ground station or drop box, which collects and distributes these messages. This ground server 116 can be the universal messaging bus ground node 210b in FIG. 2, and formats the data for the consumer. This can involve first decrypting a streamed message 300, to obtain the final data 228 unit having the topic 224 and payload 226, and then reversing the compression step(s) originally performed by the universal messaging bus onboard node 210a. This will produce the original payload 222, having the concatenated data strings 206 and the map ID 220.

The ground server 116 can also include a payload extractor, 230 in FIG. 2, which is software that, based on the data map 214, separates the raw data strings 206 and recreates the labels 204 for each of them. The labels 204 and raw data strings 206 are then put back together, so that the original raw data packets 202 are provided as output. This data can then be stored on the ground in a memory buffer 117, which can be associated with the drop box server 116. Alternatively or additionally, data storage devices can be associated with other links in the system. For example, the web portal 118 can have an associated data storage device 119, and the air fleet management system 120 can also have an associated data storage device 121. These data storage devices can be part of the specific elements 116, 118 and 120, or they can be separate devices that are connected by a suitable communication link. Any one or more of these data storage devices 117, 119, 121 or others can be used to store the streamed data. This provides a readily accessible, ground-based backup of the onboard flight data recorder, allowing the flight data to be quickly and easily accessed in situations where the physical flight data recorders cannot be retrieved or cannot be retrieved in a timely manner. Additionally, customized reports using some or all of the transmitted data can be prepared on the ground, using ground resources, rather than being produced in the air and wirelessly transmitted, adding to the bandwidth and cost of transmission. A ground station can extract only the data that is desired, and create a customized report based upon a particular ground observer's needs. In this way, the aircraft need only send the data once, and the same data can serve multiple ground observers.

With the avionics data reconstituted in its original form, the data can also be formatted for a web portal 118, whereby the data can be used and analyzed. Such a web portal can be an Airplane Health Management (AHM) service. The web portal 118 makes the data available for users, such as airlines, to follow and analyze aircraft in real time. This can be done using a web-based air fleet management system 120. In addition to automatic streaming of the in-flight data, operators and experts using the air fleet management system 120 can assist aircrews with unusual events. For example, where flight deck instruments give inconsistent readings, as was apparently the case with Air France flight 447, a ground operator with streaming data from the aircraft can view the avionics data and provide an independent assessment of the situation in real time.

Advantageously, communications between the NFS 108 onboard the aircraft and the ground is two-way, so that the data map 214 can be dynamically updated to meet changing conditions. This feature is shown in FIG. 1, which shows two-way communication, indicated by the two-way arrows in each link, from the air fleet management system 120 all the way to the NFS 108. As discussed above, the universal messaging bus ground node 210b receives streamed messages from the universal messaging bus onboard node 210a. It can also send messages to the aircraft, such as commands containing new data maps (214 in FIG. 2). For example, an aircraft operator, such as an airline, can send a new data map for an aircraft via the web-based air fleet management system 120. This new data map is routed to the ground server 116 (i.e. the universal messaging bus ground node 210b in FIG. 2), which can store the new map in memory to enable payload extraction of subsequent final data units, and encrypts and transmits the message to the NFS 108 (i.e. the universal messaging bus onboard node 210a in FIG. 2) of the aircraft. This can be done using whatever communications channel is currently selected by the dynamic link manager 212, or via some other communications link.

Upon receipt, the onboard processor 108 replaces the previous data map 214 with the new data map, and thereafter operates under new instructions about which raw data packets 202 are to be collected, filtered, compressed, and transmitted to ground. Given this functionality, data maps 214 can be dynamically defined by an operator (e.g. an airline employee or computer system using the web-based air fleet management system), stored at the ground station 116/210b, and transmitted to the onboard processor 108. This can be very helpful in an emergency situation, for example, where an operator (or an automated computer system) can dynamically adjust the scope of data to view, in order to help analyze and solve problems in real time. A wide variety of different data maps 214 can be prepared and stored for a wide range of possible situations. Additionally, a user or operator can have a menu of avionics data types to select to add to an existing map. In such a case, a new data map is created and transmitted to the aircraft simply by adding a new data type to the previous map.

Data maps can also be created and transmitted that request historical data from the data storage 109 of the NFS 108. That is, at any time during or after a flight, data representing past avionics information can be requested and transmitted to allow more robust analysis of aircraft events. For example, when an event is detected, prompting transmission of a new map indicating a new set of data, the conditions that led to that event may be indicated in past data that was not previously being transmitted. The new data map can request both a new set of real-time data and also request certain sets of historical data that may be relevant but were not previously transmitted. Indeed, any time the ground determines that recorded data is desired, it can request the NFS to transmit that data to the receiver on demand. This approach to data streaming can be viewed as "pulling" data from the ground, rather than "pushing" the data from the aircraft. That is, the system and method disclosed herein allows ground resources to choose what data to request from an aircraft.

In addition to being able to change data maps 214, the onboard processor 108 and ground station 116 can also be configured to substantially simultaneously process more than one data set via more than one data map 214. For example, multiple data maps 214 can be transmitted to the onboard processor 108, which can then substantially simultaneously prepare multiple streaming messages (300 in FIG. 3) according to each map, and transmit these messages to ground. This can allow multiple users or operators to substantially simultaneously monitor different (though perhaps overlapping) portions of the avionics data.

With the ability to dynamically change data maps 214, the onboard processor 108 can also be configured to operate in multiple different modes. For example, the NFS 108 can be programmed to operate either according to a "monitor" mode, wherein the data map identifies a first minimal data set, or an "event" mode, wherein the data map 214 identifies a second expanded data set. The first minimal data set can include, for example, only aircraft location (e.g. latitude, longitude, altitude) and flight deck control inputs (e.g. control yoke, aileron and rudder control positions). Such minimal data requires relatively small bandwidth. Other small or partial data sets can also be selected and established as a data map. The minimal data set for the "monitor" mode can be stored in the NFS 108 as a default data map to be used unless or until some other data map is selected to take its place.

On the other hand, when any one of a variety of in-flight events are detected, the NFS 108 can be programmed to automatically switch to operate in the "event" mode, in which a different default data map is used to select and transmit an expanded data set of the avionics data. In one embodiment, the second expanded data set can include substantially all flight data recorder parameters. Under FAA guidelines in the United States, flight data recorders record ninety-one (91) individual data inputs, which give data on control surface positions, engine operation and engine settings, cabin pressure, landing gear status, etc. This larger volume of data can be very valuable for resolving in-flight events and for analyzing the cause of incidents after the fact. Other expanded data sets can also be selected. For example, various smaller expanded data sets (and corresponding maps) can be created and used depending on the type of event that is detected. For example, an appropriate expanded data set for a loss of cabin pressure event may be different from an expanded data set that is appropriate for a fuel emergency. Additionally, as discussed above, many aircraft are equipped to detect and record additional items of avionics data beyond the FAA-mandated set, and a data map can be created such that the expanded data set includes this data.

Figure 3:
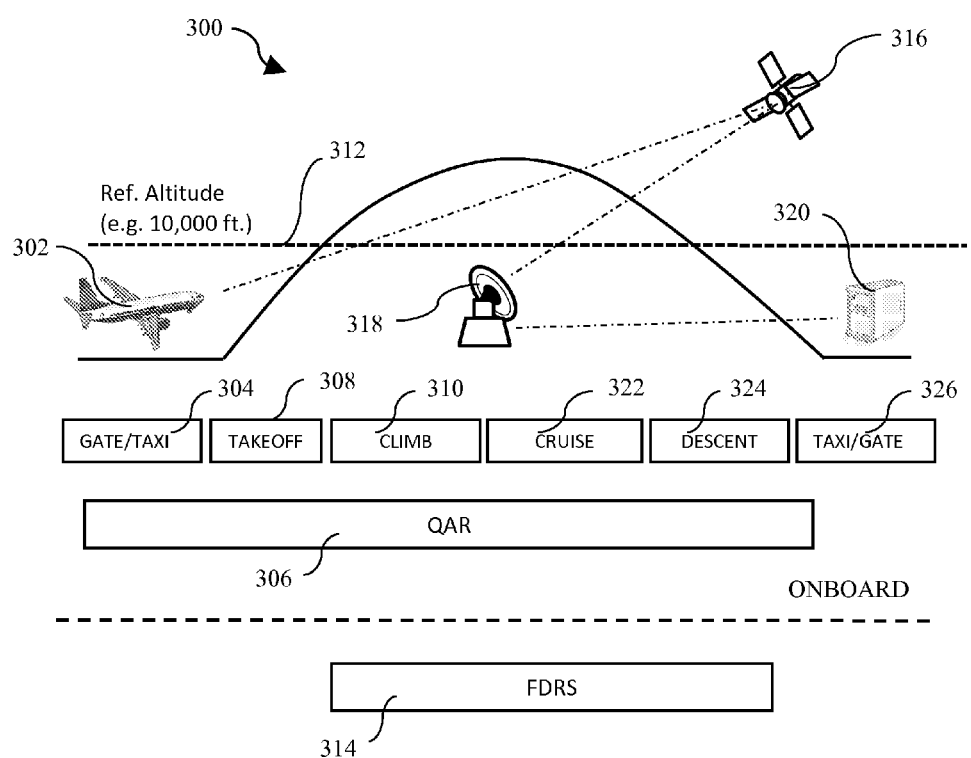
FIG. 3 is an illustration of a flight sequence, showing the temporal relationship of air-to-ground avionics streaming to flight segments in one embodiment of a method for air-to-ground avionics streaming in accordance with the present disclosure.

One embodiment of the operation of the air-to-ground avionics streaming system 100 is shown with respect to a flight sequence 300 in FIG. 3. This figure shows the temporal relationship of the air-to-ground avionics streaming to the various segments of a typical flight. As soon as an aircraft 302 leaves a gate at an airport or begins to taxi 304, the Flight Data Recorder (FDR) begins recording, and the onboard NFS system (including the Quick Access Recorder (QAR) functionality) is activated, as indicated at 306, and begins to collect data. However, at this point streaming is generally not considered necessary, since the aircraft 302 is on the ground. Likewise, during takeoff 308 the aircraft 302 is typically in view of an airport tower and in close proximity to ground resources, and therefore streaming may not be considered necessary.

After the aircraft begins to climb 310, the air-to-ground data streaming system 314 can be configured to commence streaming once the aircraft climbs above some threshold altitude 312, such as 10,000 ft. At this point, the data streaming system 314 can begin sending avionics data, which can be relayed from a satellite 316 to a ground station 318 and thence (e.g. via the Internet) to one or more ground servers 320, to allow storage of the data and access to it by authorized users. Data streaming can continue throughout the cruise portion 322 of the flight, and through the descent and landing stage 324, too. Following landing (e.g. while taxiing 326), or perhaps some time before landing (e.g. upon commencing final approach), the data streaming 314 can cease because, again, the aircraft will typically be in view of an airport tower and in relatively close proximity to ground resources, making streaming unnecessary.

Upon arrival at the gate 326, or during taxiing of the aircraft after landing, collection of data by the NFS 108 and Flight Data Recorder (FDR) 506 can also be discontinued. Also at that time, a complete transfer of all flight data stored in the NFS data storage device 109 can be accomplished. While this will typically be a very large volume of data, with the aircraft on the ground and at an air terminal, one of many types of economical and/or suitable data transfer channels, including ground-based or satellite-based, can be used to download the historical data. It is to be appreciated that the flight sequence streaming arrangement 300 shown in FIG. 3 is only one example, and other data streaming sequences and approaches can also be used.

Figure 4:
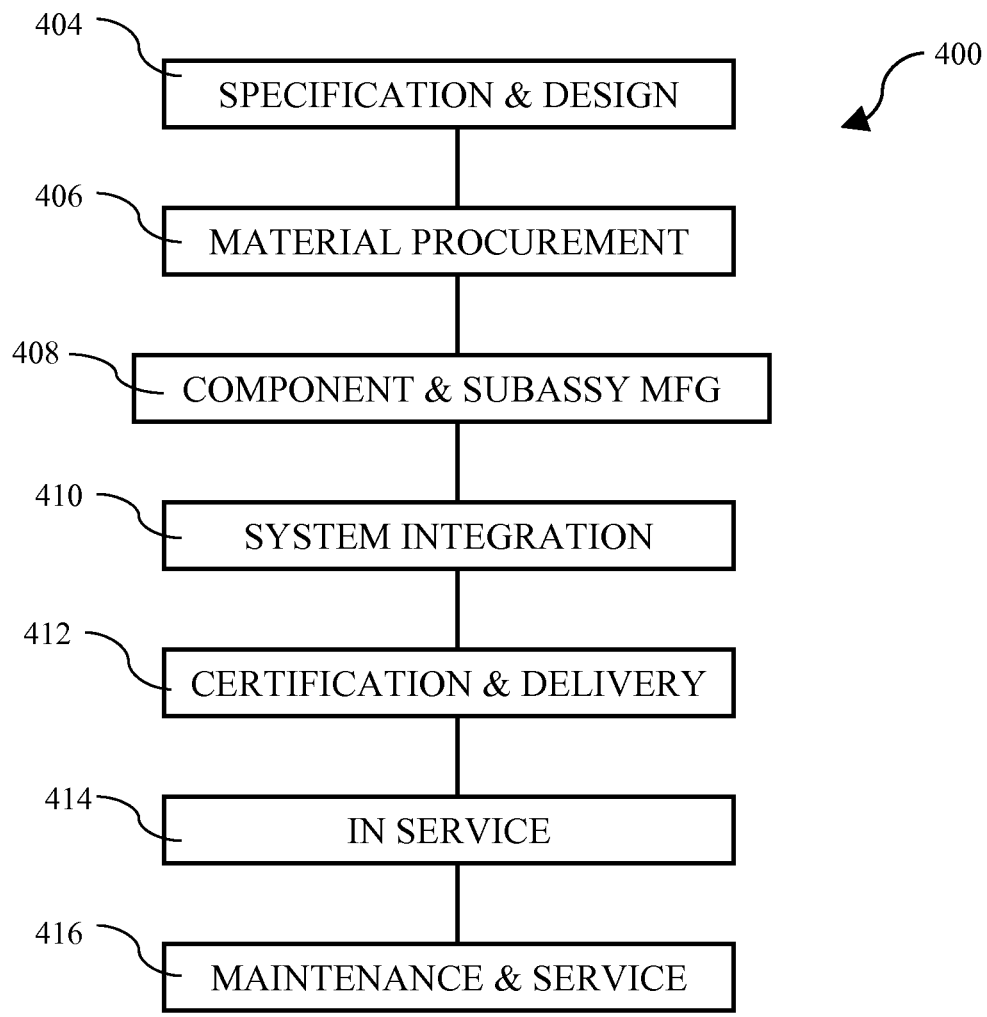
FIG. 4 is a flow diagram of aircraft production and service methodology.
Figure 5:
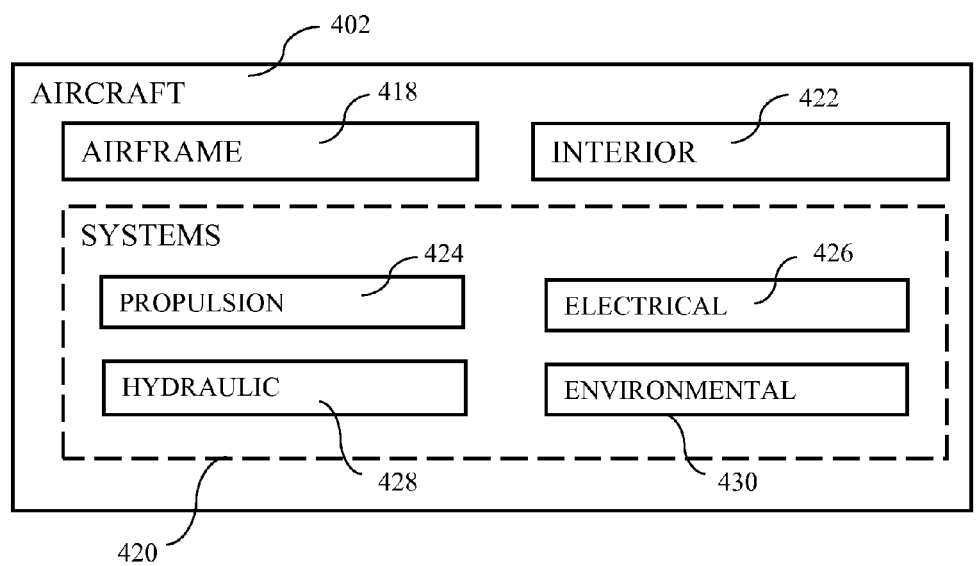
FIG. 5 is a block diagram of an aircraft.

Embodiments of the disclosure may be described in the context of an aircraft manufacturing and service method 400 as shown in FIG. 4 and an aircraft 402 as shown in FIG. 5. During pre-production, exemplary method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 402 produced by exemplary method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Apparatus and methods embodied herein may be employed during any one or more of the stages of the production and service method 400. For example, components or subassemblies corresponding to production process 408 may be fabricated or manufactured in a manner similar to components or subassemblies produced while the aircraft 402 is in service. Also, one or more apparatus embodiments, method embodiments, or a combination thereof may be utilized during the production stages 408 and 410, for example, by substantially expediting assembly of or reducing the cost of an aircraft 402. Similarly, one or more of apparatus embodiments, method embodiments, or a combination thereof may be utilized while the aircraft 402 is in service, for example and without limitation, to maintenance and service 416.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. An air-to-ground data streaming system, comprising:
    an onboard processor, disposed aboard an aircraft, configured to receive and store a data map, and to receive and encode data from an onboard Line Replaceable Unit (LRU) per the data map, and to transmit the encoded data via a transmission link, and to operate according to a monitor mode, wherein the data map identifies a first minimal data set, and an event mode, wherein the data map identifies a second expanded data set;
    a ground station, having a processor, configured to communicate the data map to the onboard processor via the transmission link, and to receive and decode the encoded data from the onboard processor per the data map; and
    a dynamic link manager, configured to identify and select at least one data path for the transmission link between the onboard processor and the ground station, and to transmit data from the onboard processor to the ground processor via the selected data path.

2. A system in accordance with claim 1, wherein the data map is defined by an operator, stored at the ground station and transmitted to the onboard processor.

3. A system in accordance with claim 1, wherein the transmission link is selected based on at least one of available bandwidth and cost.

4. A system in accordance with claim 1, wherein the transmission link is selected from the group consisting of a satellite connection, ground-based cellular transmission and air-to-ground RF transmission.

5. A system in accordance with claim 1, wherein the onboard processor and ground station are configured to process more than one data set via more than one data map.

6. A system in accordance with claim 1, wherein the first minimal data set includes at least aircraft location and flight deck control inputs, and the second expanded data set includes substantially all flight data recorder parameters.

7. A system in accordance with claim 1, further comprising a data storage device, in communication with the ground station, configured to store the data.

8. A system in accordance with claim 1, wherein the ground station provides the data to an open access global computer network via a universal messaging bus, and the data is formatted to be viewed by a subscriber.

9. A system in accordance with claim 1, wherein the ground station is configured to allow monitoring of the data by an operator, and to allow communication between the operator and a crew of the aircraft.

10. A system in accordance with claim 1, further comprising a data storage device, associated with the onboard processor, configured to receive and store the data from a plurality of LRU's aboard the aircraft.

11. A system in accordance with claim 1, wherein the encoded data comprises a plurality of concatenated data strings and a map ID that identifies the data map, the data strings being derived from a plurality of raw data packets having labels removed by the onboard processor, the raw data packets originating from a plurality of LRU's.

12. An aircraft, comprising:
an onboard processor, configured to receive and store a data map transmitted from a ground station, and to receive and encode data from an onboard Line Replaceable Unit (LRU) per the data map, and to transmit the encoded data via a transmission link to a processor of the ground station, and to operate according to a monitor mode, wherein the data map identifies a first minimal data set, and an event mode, wherein the data map identifies a second expanded data set; and
a dynamic link manager, configured to identify and select at least one data path for the transmission link between the onboard processor and the ground station, and to transmit data from the onboard processor to the ground processor via the selected data path.

13. An aircraft in accordance with claim 12, wherein the onboard processor and ground station are configured to process more than one data set via more than one data map.

14. An aircraft in accordance with claim 12, wherein the transmission link is selected based on at least one of available bandwidth and cost.

15. An aircraft in accordance with claim 12, wherein the data map is defined by an operator, stored at the ground station and transmitted to the onboard processor.

16. An aircraft in accordance with claim 12, further comprising a data storage device, associated with the onboard processor, configured to receive and store the data from a plurality of LRU's aboard the aircraft.

17. An aircraft in accordance with claim 12, wherein the encoded data comprises a plurality of concatenated data strings and a map ID that identifies the data map, the data strings being derived from a plurality of raw data packets having labels removed by the onboard processor, the raw data packets originating from a plurality of LRU's.

18. A method for air-to-ground data streaming, comprising:
receiving data, by a processor aboard an aircraft, from a Line Replaceable Unit (LRU) aboard the aircraft;
encoding the data, according to a data map received from a ground station, in one of a monitor mode, wherein the data map identifies a first minimal data set, and an event mode, wherein the data map identifies a second expanded data set; and
transmitting the encoded data in real time to the ground station via a transmission link selected by a dynamic link manager, configured to identify and select a most efficient data path.

19. A method in accordance with claim 18, wherein encoding the data comprises removing data labels, compressing the data, and encrypting the data for transmission via a universal messaging bus.

20. A method in accordance with claim 18, wherein identifying the most efficient data path comprises selecting a data path based on at least one of available bandwidth and cost.

21. A method in accordance with claim 18, wherein the transmission link includes multiple contemporaneous data paths.

22. A method in accordance with claim 18, further comprising decoding and storing the data at the ground station.

* * * * *